Figure 1:
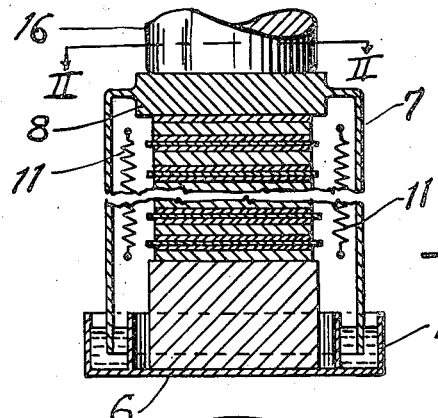

June 21, 1949.  J. KINNEY, JR  2,473,712

PROCEDURE FOR MAKING MULTI-PLY METAL STOCK

Filed July 24, 1944

- (18-8) about 0.01000" thick
- Ni. about 0.00040" "
- Ag. about 0.00002" "
- Cu. about 0.03000" "

INVENTOR.
Joseph Kinney Jr.
BY Green & McCallister
His ATTORNEYS.

Patented June 21, 1949

2,473,712

UNITED STATES PATENT OFFICE 2,473,712

PROCEDURE FOR MAKING MULTIPLY METAL STOCK

Joseph Kinney, Jr., Bradford Woods, Pa., assignor to American Cladmetals Company, a corporation of Pennsylvania Application July 24, 1944, Serial No. 546,377

8 Claims. (Cl. 29—189)

This invention relates to multi-ply, composite metal in the form of sheet metal stock and suitable for use in the production of utensils for domestic, institutional and industrial use.

I am familiar with the fact that various procedures have been developed for the production of composite or multi-ply metal stock. For example, I am familiar with the procedure employed in what may be termed the jewelers art wherein multi-ply stock is produced by interposing a sheet of brazing metal between two pieces of metal in the operation of brazing the pieces together. I am also familiar with procedures wherein slabs or plates of different metals are heated to rolling temperatures and, after appropriate treatment, such as cleaning and plating, are hot rolled while in contact with each other and while existing at a hot rolling temperature and, in this way, united to form a composite metal piece in which the separate metals, constituting the piece, are in the form of laminations or layers which are connected together throughout the entire extent of their contacting surfaces.

Procedure of this general type is not, however, wholly satisfactory where the purpose is to produce multi-ply stock in sheet form and such that the stock may be subjected to commercial operations such as pressing or deep-drawing in the manufacture of various types of utensils. One of the difficulties encountered involves the control over the thickness of the various layers of metal which constitute the multi-ply piece. This is particularly true where there is a wide variation in the rate of plastic deformation of the various metals at the temperatures and under the pressures employed in the bonding operation. Then too, the various metals constituting the multi-ply stock ordinarily respond so differently to one or more of the various steps involved by hot rolling procedures that it is difficult, if not impossible, to work out a procedure which may be effectively and efficiently employed in the production of the stock.

In addition, the operation of fabricating utensils from such rolled stock necessarily involves the production of a relatively large amount of scrap. This scrap has little or no value as such, because of its multi-metal characteristics and even though the constituent metals are costly.

An object of this invention is to provide simple and effective procedure capable of making multiply, sheet-metal stock of a desired or predetermined uniform thickness and a procedure capable of maintaining a desired or predetermined relationship as to the thickness of the component layers of metals going into the makeup of the stock.

A further object is to produce a simple, but at the same time effective, procedure for making multi-ply metal articles capable of being employed under conditions where mechanical strength and electrical conductivity are both requisites. For example, a further specific object of the invention is to produce multi-ply stock in which the strength and durability of ferrous alloys, such as chrome-nickel-steel alloys, are rendered available in connection with the electrical conductivity and non-oxidizing characteristics of a metal such as silver.

The procedure constituting the present invention fundamentally involves the separate forming of the metals which are the component layers of the composite or multi-ply stock. These separate forming operations relate both to the thickness or gage of each layer and its geometric shape. After the separate layers are separately reduced to the desired gage or thickness, they are placed in contact with each other so that their contacting surfaces are in intimate engagement throughout their entire extent and they are then subjected to heat and pressure under conditions such as to promote metallic diffusion (in the solid state) at the engaging surfaces and to thereby produce a strong and effective bond between the contacting layers.

The procedure is such as to provide a pressure and temperature relationship which can be so correlated with the period of application of the pressure that a strong and effective bond may be obtained without subjecting the more plastic metallic component of the stock to undue deformation. That is to say, the time, temperature and pressure relationships may be so adjusted that metals employed in the multi metal stock may differ widely in rate of plastic deformation, in critical temperatures, in coefficients of expansion, in their response to temperatures such as are involved and in their susceptibility to scaling, i. e., oxidation or corrosion at such temperatures.

Another feature of the invention involves adjusting the time-temperature-pressure relationship so that the diffusion bond may be produced at an annealing temperature of such component metal as is subject to a high rate of work hardening and which, therefore, requires annealing in order to facilitate subsequent forming operations.

Where it is desired to bond metals which do not readily respond to bonding by diffusion in the solid state, I have resorted to metal coating (preferably by an electro-plating operation) and have coated one or more surfaces of one metallic layer in order to provide a chemical affinity, or some such relationship between adjacent layers as will contribute to diffusion of the metals in the solid state and facilitate and expedite bonding operations.

I have, however, discovered that conditions other than the atomic relationship and/or chemical affinity are involved in bonding operations. Differences in physical characteristics of the metals involved and resulting mechanical conditions may militate against the production of the effective bond even though other conditions are favorable. For example, the difference in the coefficient of expansion of two metals may have a detrimental effect on the bonding of the same, due, possibly, to the fact that the difference occasions a relative movement between the surface of such metals while they are being subjected to bonding heat and pressure. Whether or not this is correct, I have discovered that there is a limit to the thickness of the coating or veneering metal beyond which a satisfactory bond cannot be obtained.

From the foregoing, it will be apparent that by a proper selection of the metals involved and by a proper proportioning of the gage of one such metal, i. e., the veneering metal, we are able to produce multi-ply, composite-metal stock in which the principal metals involved may be of widely different physical characteristics and may also be such that they differ widely in their response to various treatments, such for example as, the application of heat and pressure. It will also be apparent that the initial steps of the procedure involve the shaping separately of the principal metal components of the stock into layers of about the final thickness. This, in fact, involves sheet or strip forming procedure and each of the component metals is preferably reduced to sheet form by usual procedure and under conditions such as to produce sheet of commercial flatness. It also involves reducing one such metal to a thickness such that the mechanical effect of the different physical characteristics of two component metals is reduced to a point such that it does not detrimentally effect the bonding operation.

I refer to the production of three-ply stock wherein a low carbon austenitic stainless steel is combined with metal such as copper, but only as a means of defining a procedure which constitutes one embodiment of the invention. The steel sheets forming constituent parts of the composite metal stock, may be, and preferably are, reduced to any desired thickness which the use requirements of the finished article will demand, and this will be accomplished by procedures usually employed in the processing of the particular steel involved. I, however, note that it is desirable to employ relatively thin metallic layers in the makeup of the stock and by way of example, I, therefore, note that the stainless steel component may be reduced to a gage of about 0.010" and rolled under commercial conditions such as will produce commercially flat sheet or strip material. The copper of the stock will be rolled separately and by a procedure best suited to it. It may be, and preferably will be, rolled to a thickness not to exceed about 0.030". The copper should be oxygen free and I employ copper known to the trade as OFHC copper or a copper which has been deoxidized by the use of a deoxidizing agent such as phosphorus.

Where the stock is to be employed in the fabrication of a relatively small and generally circular utensil, the copper and stainless sheets of the thickness desired may be cut to circular form, for example, to circles of approximately 12" in diameter. The three pieces so formed are then cleaned, for example, by anodic pickling, so that their surfaces are free from grease and are otherwise clean. As to this preliminary cleansing step, it should be noted that the surfaces of the component layers to be united must also be free of oxides.

It will be apparent that the contemplated stock is to be made up of two circular sheets of stainless steel and an intermediate sheet of copper. The next step involves coating one flat face of each steel piece to facilitate metallic diffusion. This may be, and preferably will be, a plating operation wherein a non-oxidizing metal, such as silver, is deposited, thus providing a clean and at the same time a non-oxidizing surface. Where a ferrous alloy such as stainless steel is involved as a component of the composite metal stock, I have found that an initial or under coating of nickel is desirable. This initial coating need not exceed 0.0005" and the nickel coating operation will preferably be so limited in order to minimize or wholly avoid embrittlement. The silver coating should be at least about 0.00002" thick although to insure uniformity of spread a somewhat thicker coating may be desirable. Both coatings should be substantially uniform throughout the entire extent of the surface coated.

The copper sheet need not be plated as a preliminary to the bonding operation if it is of a high degree of commercial purity and has been thoroughly cleansed by the pickling operation. It, however, should be noted that the silver coating, previously mentioned as applied to the nickel coating, may be applied directly to a surface of the copper sheet. In this way each metal piece will be coated with a metal having a high bonding affinity for it and also for the metal of the other coating. Both flat surfaces of the copper sheet may be coated with silver, whether or not the nickel coat is overlaid with silver, since such an operation will insure clean surfaces.

The prepared sheets are now assembled so that the copper sheet lies between the stainless sheets and in contact with the entire extent of the plated or coated surfaces of those sheets. This assembly is, under normal production conditions, placed in a stack with other like assemblies and some means such as a thin steel waster sheet of high chromium content (preferably mildly scaled) is employed for separating the different assemblies. The stack of assemblies is then placed in an apparatus for heating and for also subjecting it to the bonding pressure while heated.

The apparatus is preferably such as to not only heat the stack and subject it to pressure, but also to accomplish this and at least some portion of the subsequent cooling while the stack is surrounded by a controlled atmosphere, i. e., a neutral atmosphere which will not contribute to the oxidation or any contamination of the component sheets while these sheets are subjected to the high temperature.

Figure 2:
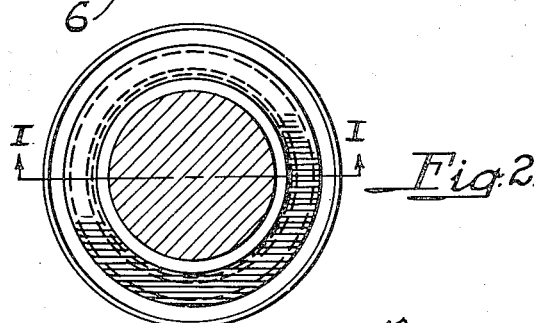
Figure 3:
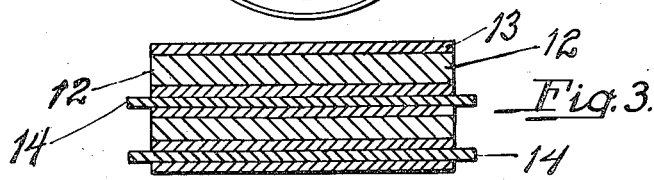
Figure 4:
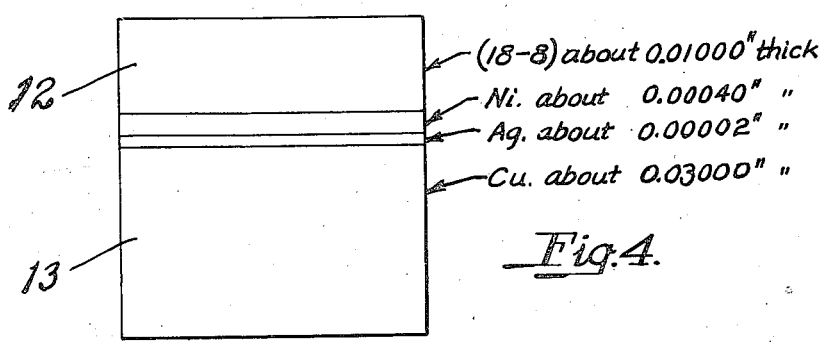

In the drawings accompanying and forming a part hereof Figure 1 is a fragmental sectional view (along the line I—I of Figure 2) of apparatus embodying my invention and capable of being employed in carrying forward the procedure herein defined as constituting an embodiment of my invention. Figure 2 is a sectional view along the line II—II of Figure 1. Figure 3 is a diagrammatic sectional view of a portion of a stack such as is employed in carrying forward my invention. Figure 4 is a side elevation and diagrammatically illustrates a modified form of assembly.

As shown in Figure 1 the apparatus includes an anvil 6 adapted to supporting a stack of assemblies and which, with the stack, is capable of being enclosed by a refractory cover 7. In the illustrated embodiment the cover is cylindrical and is provided with a rigid top 8. It may be formed of any suitable material but is illustrated as formed of a refractory metal. It is adapted to cooperation with a seal 10 for the purpose of hermetically sealing the interior thereof. The seal is illustrated as a circular trough and is adapted to be filled with a liquid capable of receiving and sealing the lower edge of the cover 7. Under ordinary operating conditions the trough will be filled with an inert salt which melts at the temperature involved and thereby provides the liquid seal.

In Figure 1 I have diagrammatically illustrated means for heating the interior of the cover and consequently the stack located therein. As shown the cover is provided at intervals around its inner walls with resistance elements 11 to which heating current may be delivered in any suitable manner.

A reference to Figure 3 discloses that each assembly consists of a stainless steel piece 12 and two copper pieces 13 engaging each side of the pieces 12. As described all of the pieces are processed for the purpose of cleaning them and some or all may be plated. A waster sheet 14 intervenes between each of the assemblies and the assembly and waster sheet are stacked on the anvil 6 as shown in Figure 1. The stack is then surrounded by the cover 7 and is of such height that the rigid top 8 of the cover engages the top of the stack. An inert gas is fed into the cover under conditions such as to completely fill it and the stack is then heated by the application of heat in any suitable manner such as by means of resistance elements 11. Pressure is applied to the top 8, and consequently to the enclosed stack, by means of a plunger or ram 16 which is preferably hydraulically actuated.

In Figure 4 the assembly illustrated consists essentially of a stainless steel piece 12 and a copper piece 13. The steel piece 12 is plated on one face with sliver but is also provided on that face with an under-coat of nickel. The plated face engages the copper piece.

The stack is heated to a temperature of about 1850° F., i. e., is heated until all parts of the stack uniformly exist at about 1850° F. While the stack exists at this temperature, pressure is so applied to it that the contacting surfaces of the component sheets, included in the different assemblies, are forced into intimate contact with each other throughout the entire extent of those surfaces. The pressure may be at least a thousand pounds per square inch of sheet area so long as the final temperature does not exceed 1850° and the pressure will be maintained for about two hours.

As previously pointed out, the time-temperature-pressure relationship may be varied. A somewhat lower pressure may be employed for forcing the contacting surfaces of the component sheets of the assemblies into intimate engagement with each other provided this is compensated for by a temperature increase and/or a time increase. That is to say, if the temperature is maintained at 1850° F., but the maximum pressure applied is in the neighborhood of 500 p. s. i., the pressure must be applied and temperature must be maintained for an increased period, e. g., about twelve hours. Conversely, a greater pressure may be applied in connection with either a reduction in the degree of heat employed or in the time of applying the heat and the pressure. As to this, however, it is noted that the pressure-heat relationship must always be such as to avoid an undesired or uncontrolled flow of the soft component metal.

After the heat and pressure treatment, the charge is relieved of the so called bonding pressure and the separate assemblies—now bonded stock—are preferably dispersed and then cooled in a neutral atmosphere for the purpose of completing the bright anneal of the stainless steel component of each assembly. This cooling, however, may be accomplished under any desired condition in so far as the actual bonding operation is concerned.

It will be understood that while I have described procedure for making a three-ply stock with stainless steel sheets, in effect, constituting a veneering for a copper core, substantially the same procedure may be employed in making two-ply stock, i. e., wherein a single stainless steel sheet is bonded to a copper sheet so as to produce composite stock which exhibits the characteristics of stainless steel on one side and the characteristics of copper on the other side.

For the purpose of disclosing a further embodiment of the invention, I refer next to composite metal stock made from a copper and a chromium steel, for example, of the type #430 (S. A. E.) containing up to 17% chrome. As previously stated, both the copper and the steel components of the stock will be preliminarily processed to the desired thickness as a preliminary to the bonding operation and this will be done separately and by usual procedures. The copper will be de-oxidized or oxygen free copper. All sheets going into the makeup of the stock will be commercially flat and also thoroughly cleansed and every precaution will be taken to prevent oxidation of the surfaces of the sheets which are to be bonded. While the size—other than thickness—is controlled only by the capacity of the apparatus for heating and applying pressure, nevertheless, we suggest that if the component sheets of the assemblies here under consideration are rectangular, they should be approximately 15" x 15".

As to the geometric shape, I also note that this, as well as the size, is designated by the articles to be made from the finished stock. In this case also the stock may be two-ply or three-ply and where two-ply stock is contemplated, it will be desirable to employ a chrome steel sheet having a thickness of about $\frac{1}{16}$" and a copper sheet having a thickness of about 0.150" or any other convenient thickness so that the overall thickness of the completed stock will be approximately 0.2". If, however, the copper constitutes the veneering metal, i. e., the metal to be applied to a thicker base metal, then it should be rolled to a thickness of not more than about $\frac{1}{16}$" since, under such circumstances, it must be of a thickness such as will compensate for the variation in the physical characteristics of the two metals.

The component sheets may be selected from commercial stock and the steel sheets may be annealed or hard, since, the bonding process may be so carried forward as to, in effect, constitute a bright anneal for these sheets. Both the copper and steel sheets are cleansed as previously described and the steel is plated with silver over an under coating of nickel, all as previously described. I have found that the silver is a highly desirable coating, not only because it contributes to the diffusion process involved, but also because it is a readily obtainable commercial metal which resists oxidation even under temperature conditions such as are here involved. The assemblies of copper and chrome-steel sheets are made up, as previously described, and charged into heating and pressing apparatus and the heating and pressing is preferably accomplished within a neutral atmosphere.

I recommend about 1850° as the bonding temperature for these assemblies. During the heating operation and before the critical temperature (about 1475° F.) of the chrome-steel is exceeded, the bonding pressure is applied and maintained throughout the further heating of the stack and for about two hours after all portions of the stack have been uniformly heated to the bonding temperature. The pressure in question is preferably 1000 p. s. i. under time and pressure conditions above stated. Here again various changes may be made in the temperature-time-pressure relationship. However, it is desirable to avoid heating to such a temperature that the copper will be materially distorted, i. e., spread and reduced in thickness, during the application of the pressure. It is desirable and in fact essential to so apply the bonding pressure to the assemblies as to automatically accommodate such reciprocal forces as may be encountered during the application of heat and pressure. For example, the expansive forces encountered must be compensated for and it is also essential to maintain the desired pressure independently of such contraction of the stack as may be encountered. For this reason, I have found it convenient to apply the bonding pressure hydraulically although mechanical means may be developed which will maintain the bonding pressure substantially uniform, independently of variations in the dimensions of the stack.

After the assemblies are heated and subjected to the bonding pressure, they constitute composite metal stock and the veneering layer of each assembly is so strongly bonded to the base-layer, that the multi-ply metal stock may be subjected to such fabricating procedures as may be necessary or desirable for completing it into finished articles.

Where the veneering metal is not over about $\frac{1}{16}$ of an inch, bonding between it and the base metal is such that the resulting composite stock may be subjected to even cold rolling without rupturing the bond. When the cold rolling is so conducted as to accomplish about 10% reduction per pass, the stock should be given an intermediate anneal after each reduction in the neighborhood of 30%. Hot rolling may be resorted to but, if so, both the heating and the rolling should be accomplished in a sulphur free atmosphere. The rolled stock may be subjected to an appropriate anneal and then fabricated into finished articles.

Where silver is one of the component metals, for example, the veneering metal for steel or stainless steel, it should be oxygen-free silver. Precautions should also be taken to avoid the occlusion of oxygen during the procedure of accomplishing the bond.

Where silver is employed as one of the principal metals of a multi-ply stock including, for example, a ferrous alloy, such as mild steel or stainless steel, a procedure such as heretofore outlined in connection with the production of such a multi-ply stock containing copper, may be followed. Here again, all metallic surfaces subjected to diffusion bonding will be cleansed and the surface of the ferrous alloy will preferably be preliminarily plated so as to provide a thin undercoat of nickel. The surface of the silver sheet may also be electro-plated so as to insure at least a relatively thin bonding surface of clean silver. The component metals are then formed into assemblies and the assemblies into a stack as previously described and while so assembled are subjected to temperatures within the range of from about 1500° F. to about 1650° F. while their cleansed and plated surfaces are forced into intimate contact with each other.

The veneering metal should not exceed 0.0625" and where silver is the veneering metal it preferably should not exceed 0.0365" in thickness. Heat and pressure will be applied as previously described and the stack of bonded stock will preferably be cooled under conditions to avoid scaling or oxidation. The stock may then be fabricated into finished utensils or articles all as described in connection with stock containing copper as one of the principal metals.

One of the features of my invention is that the time, temperature and pressure relationship may be so controlled that the bonding operation effectively anneals one of the constituent metals of the multi-ply stock. For example, where the basic metal of such stock is an austenitic steel such as commercial 18-8, a bonding temperature of over 1850° F. may be employed thus accomplishing the double effect of producing the multi-ply stock and at the same time subjecting the ferrous alloy forming a constituent of that stock, to an effective annealing temperature. It will thus be apparent that the possible variations in the time, temperature, pressure relationship may be employed to advantage in connection with various metals employed in the make-up of the multi-ply stock. In connection with the use of relatively high temperatures for annealing purposes, it is interesting to note that the copper constituent of e. g., a stainless steel-copper stock is not detrimentally effected as to its drawing qualities or its conductive characteristics even though subjected to a temperature sufficient to anneal the stainless steel constituent of the stock.

While I have described procedural steps which result in the effective bonding of such metals as copper and silver with stainless steel, it will be apparent that various changes in the procedure outlined may be resorted to without departing from the spirit and scope of my invention as defined by the appended claims.

What I claim is:

1. A method of making multi-ply metal in which the component metals are austenitic stainless steel and oxygen-free copper, which consists in separately rolling a quantity of each such metal to sheet-like form and to substantially final gauge, the stainless component being about 0.010" thick and the copper component being about 0.030" thick; cutting a piece of metal to final form from each portion of sheet-like material so rolled; processing at least one surface of each such piece to provide an oxygen-free surface on the copper piece and a uniform coating of nickel, of a thickness not to exceed 0.0005", on the stainless steel piece; forming a multi-ply assembly by matching such pieces with their processed faces in contact throughout substantially the entire extent of each such piece; then forcing and holding the pieces so assembled in intimate contact under a pressure of at least 500 p. s. i. while subjecting them to heat so proportioned as to temperature and so applied as to time as to anneal said stainless steel and form a fusion bond between the pieces of such assembly.

2. A method of making a multi-ply metal article, the component metals of which are austenitic stainless steel and oxygen-free copper, which consists in separately processing such component metals to sheet form of substantially final gauge of not more than 0.0625″ thick; cutting such sheets into pieces of final shape; subjecting surfaces of the metal so processed, which are to engage each other; to a pickling operation to clean and deoxidize the same; providing at least one of such processed surfaces with a uniform coating not to exceed 0.0005″ thick of a metal having a bonding affinity for the metal so coated; assembling the sheets so cleaned and coated in register with the cleaned and coated surfaces thereof in engagement with each other; subjecting assemblies so formed to pressure of at least 500 p. s. i. to force and hold the surfaces thereof in intimate engagement throughout while heating the sheets so held to a temperature within the range of 1600° F. to 1850° F. and while so proportioning the degree of such heat, the degree of such pressure and the time of application of such heat and pressure so as to anneal the stainless steel constituting a part of such assembly and form a fusion bond between the metals of such assembly.

3. A method of making multi-ply metal in which the component metals are austenitic stainless steel and silver, which consists in separately rolling a quantity of each such metal to sheet form of a gauge not to exceed 0.0625″; cutting a piece to final form from each such quantity so rolled; subjecting surfaces of pieces so cut, which are to engage each other, to a pickling operation to clean and deoxidize the same; forming a multi-ply assembly by matching such pieces with their cleaned surfaces in contact with each other throughout substantially the entire extent of each such piece; and, forcing such pieces of such assembly into intimate contact with each other under a pressure of at least 500 p. s. i. while maintaining the same at a temperature within the range of from about 1550° F. to 1600° F. for a period sufficient to anneal the stainless steel of such assembly and to bond together the metals thereof.

4. A method of making a multi-ply metal article, the principal components of which are austenitic stainless steel and oygen-free copper, which consists in separately processing such component metals to sheet form and substantially final gauge of not more than 0.0625″ thick; cutting the sheets so produced into pieces of final form; processing the surfaces of the pieces so cut which are to engage each other, to clean and deoxidize the same; providing the processed surface of each stainless steel piece with a uniform coating of nickel which is not in excess of 0.0005″ thick; applying a uniform coating of silver of about 0.00002″ thick to said nickel coating; forming a multi-ply assembly by matching the pieces so cut with their cleaned and coated faces in contact with each other throughout substantially the entire extent of each such piece; forcing the pieces of each such assembly into intimate contact with each other under a pressure in excess of 500 p. s. i. and while maintaining the same at a temperature within the range of from 1600° F. to 1850° F. and so proportioning the pressure, the temperature and the time of application thereof to anneal the stainless steel piece of each such assembly and to bond together the pieces thereof.

5. A method of making multi-ply metal in sheet form and consisting of an oxygen-free copper core and a stainless steel veneer bonded to each face thereof, which consists in separately rolling a quantity of each such metal to sheet form and to substantially final gauge with the stainless steel about 0.010″ thick and the copper component about 0.030″ thick; cutting pieces to substantially final form from each such quantity so rolled; cleaning both faces of the copper piece and at least one face of each of two stainless steel pieces so cut; forming a multi-ply assembly by matching the pieces so cleaned with their cleaned faces in contact and with a stainless steel piece on each side of the copper piece; forcing the pieces so assembled into contact under at least 500 p. s. i. and subjecting the assembly while under such pressure to sufficient heat to anneal the stainless steel component pieces thereof.

6. A method of making a multi-ply metal article the components of which are austenitic stainless steel and copper, which consists in separately processing such component metals to sheet form of a gauge not substantially more than 0.065″ thick; cutting pieces of substantially the same size and shape from sheets of both such metals; subjecting the surfaces of the pieces so cut which are to engage each other in the multi-ply article, to a pickling operation to clean and deoxidize the same; assembling the pieces in matched relationship with pieces of different component metals in engagement with each other and with cleaned surfaces in contact with each other throughout substantially the entire extent of each such surface; subjecting the assembly so formed to pressure of at least about 500 p. s. i. throughout substantially the entire extent of the contacting surfaces; subjecting the assembly while under such pressure to heat within the temperature range of from 1600° F. to 1650° F. and until the stainless steel component of the assembly is annealed and the component pieces thereof are bonded.

7. A method of making multi-ply metal, the component metals of which are stainless steel and oxygen-free copper, which consists in separately rolling such component metals to sheet form of a final gauge of not more than 0.0625″ thick; cutting pieces of substantially the same size and shape from sheets of each such metal; processing the surfaces of such pieces which are to contact each other in the multi-ply metal so as to clean the same; coating at least one of such processed surfaces throughout the entire extent thereof with a substantially uniform coating approximately 0.0005″ thick of a metal having a bonding affinity for at least one of the component metals; assembling the cut pieces in register with each other so that a piece of each component metal contacts at least one piece of another component metal with their cleaned and coated faces in contact throughout substantially the entire extent of each such face; forcing the contacting surfaces into intimate engagement with each other under a pressure of at least 500 p. s. i.; subjecting the assembly to heat while under such pressure and so proportioning the degree of pressure, and the degree of heat and the time of application thereof so as to anneal the stainless steel component of the assembly and form a fusion bond between the metals of the assembly.

8. A method of making multi-ply metal stock the principal components of which are stainless steel and silver, which consists in separately rolling a quantity of each such metal to sheet form and of a gauge not in excess of 0.0625"; cutting pieces of substantially the same size and shape from each such quantity so rolled; processing surfaces of the pieces so cut which are to engage each other in the multi-ply stock to clean and deoxidize the same; forming a multi-ply assembly by matching such pieces with each such piece of one component metal in contact with at least one piece of the other component metal and with their cleaned surfaces engaging each other throughout substantially the entire extent of each such surface; subjecting the assemblies to 500 p. s. i. throughout the extent of their contacting surfaces, and subjecting the assembly to heat within the temperature range of from 1550° F. to 1850° F. for a period sufficient to anneal the stainless steel and to bond the metals of the assembly together, while the assembly is subjected to such pressure.

JOSEPH KINNEY, JR.

REFERENCES CITED

The following references are of record in the file of this patent:

UNITED STATES PATENTS

| Number | Name | Date |
| --- | --- | --- |
| 401,900 | Palmer | Apr. 23, 1889 |
| 625,117 | Martin | May 16, 1899 |
| 1,302,563 | Klocke | May 6, 1919 |
| 1,869,208 | McMillen | July 26, 1932 |
| 1,943,853 | Austen | Jan. 16, 1934 |
| 1,956,818 | Acre | May 1, 1934 |
| 2,024,150 | Davignon | Dec. 17, 1935 |
| 2,147,407 | Huston | Feb. 14, 1939 |
| 2,161,116 | White | June 6, 1939 |
| 2,266,972 | Holmquist | Dec. 23, 1941 |
| 2,269,523 | Deutsch | Jan. 13, 1942 |
| 2,284,504 | Wrighton | May 26, 1942 |